United States Patent [19]

Roffelsen

[11] Patent Number: 4,747,737
[45] Date of Patent: May 31, 1988

[54] FIXING DEVICE FOR MOUNTING OBJECTS ON SUPPORTS

[75] Inventor: Franciscus Roffelsen, Helmond, Netherlands

[73] Assignee: Spiro Research B.V., Helmond, Netherlands

[21] Appl. No.: 945,192

[22] Filed: Dec. 22, 1986

Related U.S. Application Data

[63] Continuation of Ser. No. 667,014, Nov. 1, 1984, abandoned.

[30] Foreign Application Priority Data

Nov. 3, 1983 [DE] Fed. Rep. of Germany ....... 3339765

[51] Int. Cl.[4] ........................... F16B 13/04; F16L 3/08
[52] U.S. Cl. ...................................... 411/34; 411/400; 411/546; 248/316.3; 248/70
[58] Field of Search ................................ 411/368–372, 411/34–38, 535, 536, 537, 539, 540, 546, 531, 538, 401, 400; 248/70, 71, 231.91, 231.3, 232–234, 213.4, 213.3, 348, 349, 316.3

[56] References Cited

U.S. PATENT DOCUMENTS

| | | | |
|---|---|---|---|
| 1,044,055 | 11/1912 | Johnson et al. | 411/531 |
| 1,420,703 | 6/1922 | Holland | 238/317 |
| 1,854,277 | 4/1932 | Schatz | 411/368 |
| 1,958,497 | 5/1934 | Rivers | 411/368 |
| 3,124,370 | 3/1964 | Traugott | 411/531 |
| 3,222,793 | 12/1965 | Johnson | 411/539 |
| 3,897,925 | 8/1975 | Mayer | 248/233 |
| 4,108,043 | 8/1978 | Varga | 411/34 |

FOREIGN PATENT DOCUMENTS

| | | | |
|---|---|---|---|
| 2366481 | 6/1978 | France | 411/536 |
| 135706 | 5/1952 | Sweden | 411/34 |
| 925785 | 5/1963 | United Kingdom | 248/316.3 |

Primary Examiner—Neill Wilson
Attorney, Agent, or Firm—Toren, McGeady & Associates

[57] ABSTRACT

A fastening element with an adjustment flange and an eccentric segment for objects to be suspended as, in particular, heating elements or convectors, which engages into bores of an attachment wall and a rear wall of the object lying opposite each other, has between an outer adjustment flange and an inner flange an adjustment eccentric clamped eccentrically with respect to the flanges for compensation of alignment errors of the bores, whereby the surface of the inner flange facing away from the eccentric comes to rest against the attachment wall externally of the bore receiving a bolt and the adjustment eccentric slid loosely upon the bolt is arranged only in the area of the bore of the rear wall to be pivotable around the bolt from outside of the bore.

11 Claims, 5 Drawing Sheets

FIXING DEVICE FOR MOUNTING OBJECTS ON SUPPORTS

This is a continuation of application Ser. No. 667,014, filed Nov. 1, 1984, now abandoned.

This invention relates to a fixing device for suspending or otherwise mounting an object on a support, the object and the support having partially registering bores.

In the mounting or suspending of objects, for example wall radiators or cupboards, in a rear wall of which holes can easily be drilled or in which mounting holes are already present, accurately horizontal positioning of the suspended object can only be achieved if the bores in the rear wall of the object to be suspended are aligned exactly with those in the supporting wall. To avoid the suspended object adopting a skew position, no tolerances are admissible in the alignment of the bores in the vertical direction. In particular in the case of a supporting wall of brickwork or masonry having considerable differences in hardness between stone and mortar, it is almost impossible to prevent the bore drilled in the wall from running off line in some direction. Accurate positioning of the object to be supsended when holes run off their correct alignment is very difficult to achieve, if indeed possible.

The problem of misaligned bores which are not accurately in register with one another frequently occurs in practice; for achieving accurate position of workpiece connections joined by screws and bolts, it is known (periodical "Machine Design"50 (1978 12, pages 81 to 82), to use in addition to the screws or bolts, conical or cylindrical securing pins. A further assurance of alignment of screw connections is provided by additional sleeves, which are used if necessary together with the fitting screws and pins.

The object of the present invention is to provide a fixing device as initially described, which even where the bores are appreciably misaligned and a wall which may form the support is uneven, permits accurate mounting and positioning of the suspended object, such as in particular a convector heater, in a simple manner, so that even unskilled persons can carry out this work without difficulty.

To this end, according to this invention, a fixing device as initially described comprises a bolt, means for anchoring the bolt in the bore in the support, and an adjusting eccentric which, in use, fits in the bore in the object and which is mounted on a part of the bolt which in use, projects from the bore in the support, the eccentric being rotatable about the axis of the bolt to allow for inaccuracy in the relative positions of the bolt and of the bore in the object in a direction transverse to the axis of the bolt.

Depending upon the transverse movement of the adjusting eccentric which may be loosely pushed onto the bolt, the bore in the object to be mounted can be made sufficiently large that, even in the case of a bore in the wall of the support which is considerably out of position in the vertical direction, horizontal or other required positioning of the mounted object can be achieved. It is only necessary, after the bolt has been inserted, for the adjustment eccentric to be rotated in the bore in the object around the bolt until the object has adopted the desired position.

In order that the adjusting eccentric can be adapted to any thickness of the part of the object in which the bore is formed, the eccentric may consist of discs which key into one another and are pushed onto the bolt. These discs make it possible to accommodate any desired variation in the thickness of the adjusting eccentric within the limits of steps equal to the thickness of each disc. An external mounting flange may be keyed to the adjusting eccentric. The rotation of the eccentric can then be effected by rotating the flange, which preferably incorporates a hexagonal flange nut, simply by fitting a spanner onto the nut. In order that the keying shall be assured, the mounting flange preferably has either a recess which cooperates with the adjusting eccentric and is off-centre to the bore for the bolt, or a straight bearing surface having a projecting hump or cam, which engages into the surface of the first disc of the assembled adjusting eccentric.

If the adjusting eccentric is clamped between a mounting flange and an inner flange, a compact unit is obtained, and additional guidance of the adjusting eccentric during rotation can be obtained if the adjusting eccentric has a part which engages in a recess in the inner flange concentric with the bolt. The recess then has a diameter which permits the full outward radial movement of the eccentric as it is rotated. This supporting recess, which is formed concentrically with the through bore for the bolt, is however not absolutely necessary. Enclosure of the adjusting eccentric can also be assured by an inner flange having a flat outer face, against which the adjusting eccentric bears with a flat end face.

In order for irregularities of the supporting wall not to have an adverse effect during mounting of the object, the inner flange preferably has a hub located away from the recess, and also a peripheral collar projecting in the same direction as the hub. The wall of the object which fits over the eccentric is then spaced by the hub and collar a short distance from the fixing wall, any irregularities of which are compensated for by the inner flange. If the hub extends beyond the peripheral collar into the bore in the supporting wall, this hub also protects the bore against breakage out of material. This effect can, alternatively, be achieved by a plastic expansion sleeve and/or a protective sleeve pushed onto the bolt in front of the hub of the inner flange. The simultaneous use of a plastic expansion component of a soft material, which may form the means for anchoring the bolt, leads, during tightening up of a nut on the bolt, to an expansion of the sleeve and thus to a positive fixing of the bolt in the bore in the support.

Instead of separate components, a one-piece unit consisting of a mounting flange and also an inner flange and the eccentric disposed there-between may be used. Such a one-piece unit, which may be pushed completely onto the bolt, is suitable especially for a series of articles having rear walls of a constant thickness, so that adapting of the thickness of the adjusting eccentric by the adding of further discs becomes unnecessary. In this case, of course, the object must have a bore of sufficient diameter for the mounting flange to pass through it. This arrangement is in particular suitable for objects which have upwardly projecting sheet metal lugs with large apertures, which can be raised above the flanges and then be guided down between the flanges as far as the eccentric. By contrast to the unit made up of individual components, with a one-piece unit, the inner flange also rotates when the eccentric is rotated. The exact adjustment movement of the eccentric may be indicated by a front mark on the device which indicates the outward travel of the eccentric. This mark is preferably on the flange nut when this is provided and it may, for example indicate the point of maximum offset of the eccentric.

Flanges and adjusting eccentrics made from plastics material are especially economical.

When the device is assembled, all the components, that is the bolt, the flanges and discs of the adjusting eccentric and also if necessary the protective sleeve and an expansion sleeve or other anchoring means may be clamped between a head of the bolt and a nut screwed on to the bolt.

Three examples of devices in accordance with the invention will now be described with reference to the accompanying drawings in which.

Figure 3:
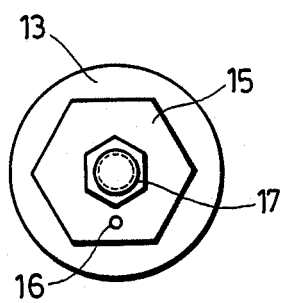
FIG. 3 is a plan view of either of the examples.

A fixing device comprises a bolt 2 with a screw head at one end and with its other end which has a head 3 extending into a bore 4 of a supporting wall 5. In the bore 4, a plastics expansion sleeve 6 and a hard protective sleeve 7 surround the bolt 2 and form anchoring means. On the portion of the bolt projecting out of the bore 4, there is a pushed-on inner flange 8, an adjusting eccentric 12 composed of a plurality of discs 9 keyed into one another, and also an external mounting flange 13, keyed into the outer disc 9a of the adjusting eccentric 12. The form fit or key between the mounting flange 13 and the adjusting eccentric 12 is assured by a hump 14 on the mounting flange 13 engaging into a recess in the disc 9a. The mounting flange 13 has in addition an outwardly projecting flange nut 15, of hexagonal form, having a fixed marking 16 denoting the offset direction of the eccentric. During tightening up of the supporting element 1, a nut 17 screwed onto the screw threaded bolt 2 bears against the outer face of the flange nut 15 (see FIG. 3).

When a load is applied to a spanner, for example, fitted onto the flange nut 15, the adjusting movement of the mounting flange 13 is transmitted via the keyed conection of the hump 14, to the assembled adjusting eccentric 12, which turns by a corresponding amount on the bolt 2. In this turning movement a flat inner disc 9b slides on the bearing surface of the stationary inner flange 8. The inner flange 8 has adjacent the masonry wall 5, a hub 18 and an outer peripheral collar 19, which compensate for irregularities of the brickwork or wall surface occurring in the horizontal direction. The hub 18 may also be longer and extended if desired, instead of the protective sleeve 7, far into the bore 4.

Figure 1:
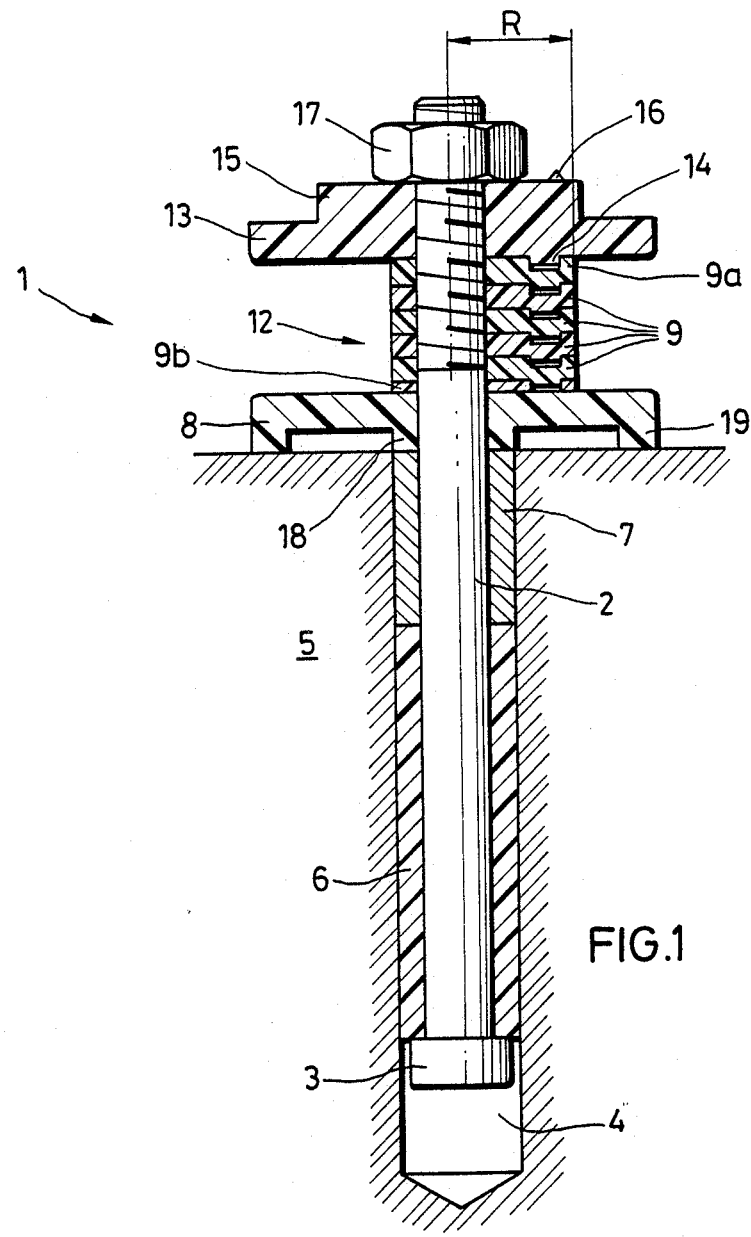
FIG. 1 is a longitudinal section through a first example.
Figure 2:
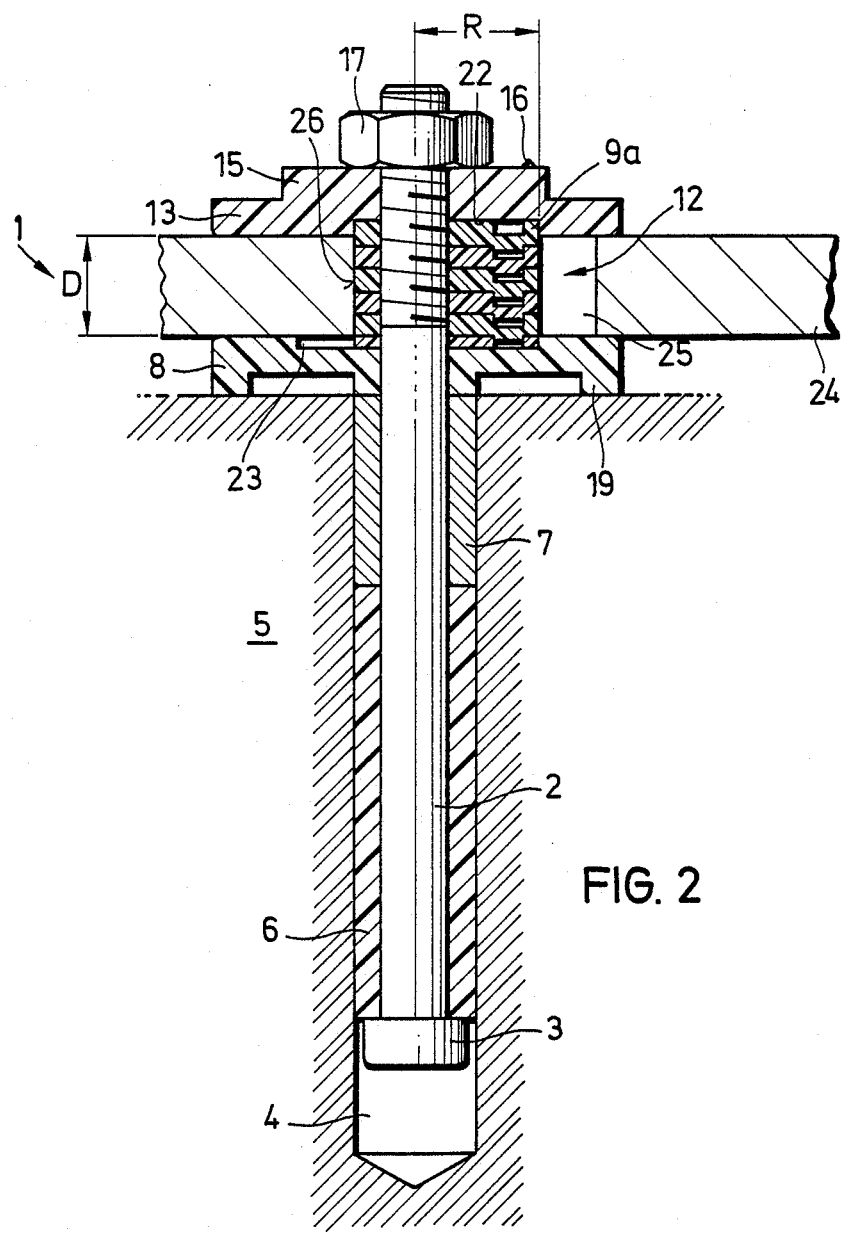
FIG. 2 is a longitudinal section through a second example.

The example of FIG. 2 differs from that of FIG. 1 solely by differences in the keyed connection between the mounting flange 13 and the adjusting eccentric 12 and in the guidance of the adjusting eccentric 12 on the inner flange 8. The key in this example is obtained by a recess 22 in the mounting flange 13, eccentric to the bore for the bolt 2, into which recess the outer disc 9a of the adjusting eccentric 12 engages. At the opposite end of the adjusting eccentric 12, the flat inner disc 9b likewise engages in a recess 23, which is situated in the inner flange concentrically with the bore for the bolt and has a diameter adapted to the full radial movement of the eccentric.

The assembly of the device will now be described with reference to FIG. 2, together with a rear wall 24 of an object to be mounted which is not shown in more detail. After the required centre of the bore in the support has been established, the bore 4 is made in the supporting masonry wall 5 by means of a drilling machine. The bolt 2 is then inserted with its head end, together with the plastic expansion sleeve 6 and protective sleeve 7, into the bore 4. On the part of the bolt 2 projecting out from the wall 5, the inner flange 8 and, depending upon the thickness D of the rear wall of the object, a corresponding number of discs 9, 9a, 9b, keyed into one another, are then pushed on and form the adjusting eccentric 12. For compensating for any errors in alignment of the bore 4, the bore 25 in the rear wall of the object can be constructed sufficiently large for a bore diameter of at least twice the maximum radial movement R of the eccentric to be present calculated from the axis of the bolt 2. With the fitting on of the mounting flange 13 and of a nut 17, which acts as a lock nut when tightened, the adjusting eccentric 12 becomes fixed between the two flanges 13 and 8, the outer disc 9a engaging into the eccentric recess 22 of the mounting flange 13 and the inner disc 9b engaging into the concentric recess 23 of the inner flange 8. When the adjusting eccentric 12 is rotated by means of a spanner fitted onto the flange nut 15, the mounting flange 13 rotates the adjusting eccentric 12 on the bolt 2 until an exact perpendicular bearing line or surface 26 is present in the bore 25. As soon as a required location of the object to be mounted has been set in this manner, the nut 17 can be tightened and the rear wall 24 is then firmly clamped between the two flanges 13 and 8.

Figure 4:
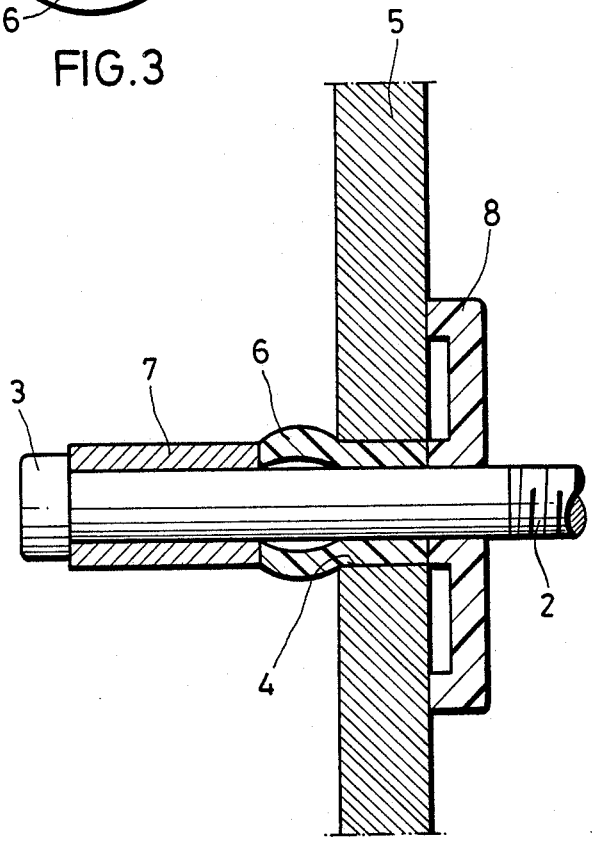
FIG. 4 is a longitudinal section through part of a third example.

If only a relatively thin supporting wall or plate 5 is available for an object to be suspended or otherwise mounted as shown in FIG. 4, a secure holding of the supporting element in the wall 5 can be obtained by the plastic expansion sleeve 6 being inserted between the protective sleeve 7, bearing against the head 3 of the bolt 2, and the hub 18 of the inner flange 8. When the nut 17 is tightened up, the deformable expansion sleeve 6 then expands and causes, immediately behind the bore 4, an accumulation of material which prevents axial movement of the fixing device. If the wall or plate 5 has a flat bearing surface, the inner flange 8 can be dispensed with, so that the rear wall 24 then bears directly against the supporting wall 5.

Figure 5:
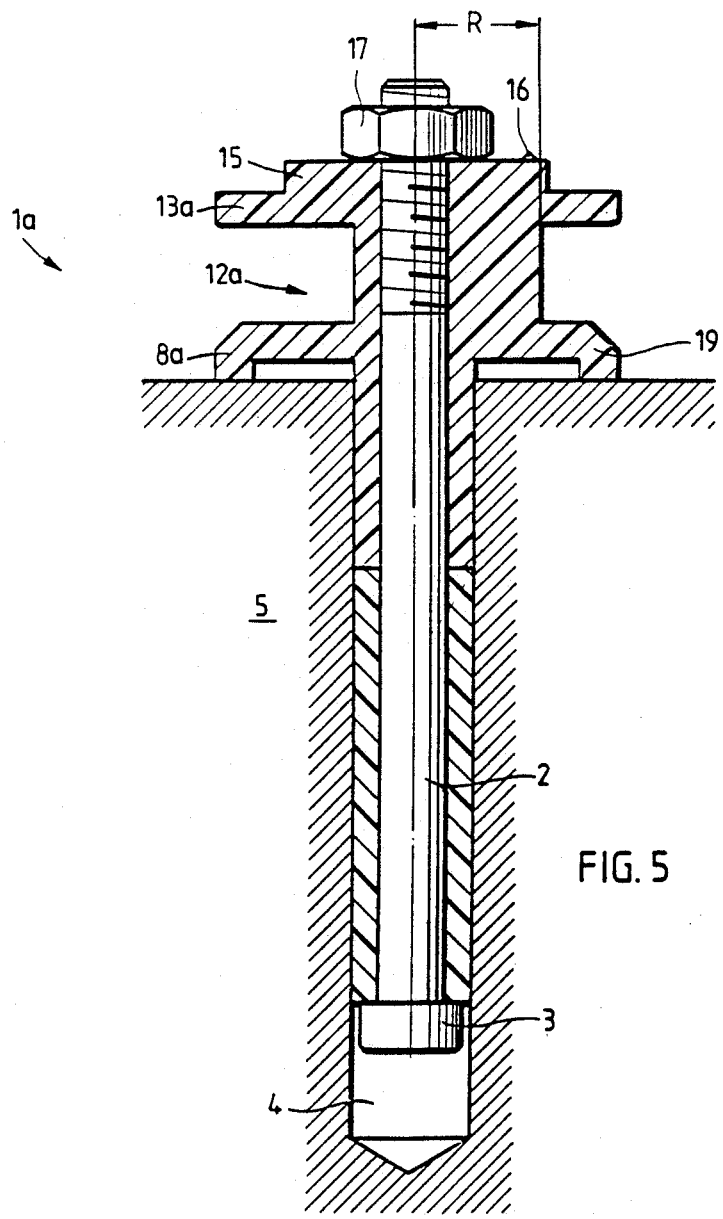
FIG. 5 is a longitudinal section through a second element.
Figure 6:
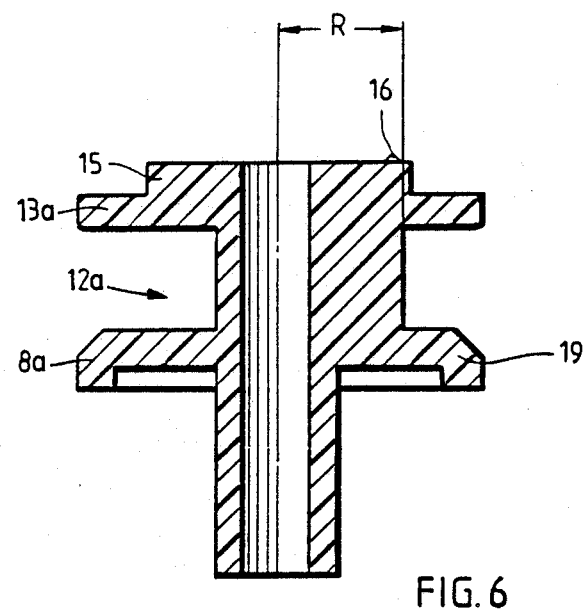
FIG. 6 is a longitudinal section of the eccentric shown in FIG. 1.

In FIG. 5 a fixing device 1a is shown of the same construction as illustrated in FIG. 1 except instead of a multi-part adjusting eccentric 12 a one-piece unit eccentric 12a displayed formed monolithically with the inner flange 8a and the external mounting flange 13a. The combined eccentric 12a with the inner flange 8a and mounting flange 13a is shown in FIG. 6.

I claim:

1. In a fixing device for mounting an object on a support, such as for mounting heating elements or convectors, comrpising a fastening element including an adjsutment mounting flange and an adjusting eccentric, said fastening element arranged to be installed into a bore in the support on which the object is to be mounted, the object to be mounted has a bore therethrough arranged to be in general alignment with the bore in the support, wherein the improvement comprises that said fastening element comprises an axially elongated bolt having a first axially extending section arranged to extend into the bore in the support and a second axially extending section arranged to extend out of the bore in the support and through the bore in the object, said adjustment mounting flange (13) is positioned on the second axially extending section so that it is spaced outwardly from the support, an inner flange (8) located on the second axially extending section between said mounting flange (13) and the support, said inner flange (8) spaced axially from said mounting flange, said adjusting eccentric (12) is mounted on said bolt between said inner flange and said mounting flange, said adjusting eccentric (12) being eccentric to said bolt and said inner and outer mounting flanges, said inner flange having a pair of opposite surfaces extending transversely of the axial direction of said bolt with one surface arranged to bear against the support surface and the other surface arranged to bear against said adjusting eccentric, said adjusting eccentric (12) being rotably mounted on said bolt (2) and arranged to extend through and contact the surface of the bore in the object to allow for any inaccuracy in the relative positions of said bolt and the bore in the object, and said eccentric includes a plurality of discs arranged face to face, means rotatably mounting said discs on said bolt and means keying said discs together for simultaneous rotation on said bolt.

2. A device as claimed in claim 1, further comprising a flange nut incorporated in said mounting flange and means keying said mounting flange to said eccentric, whereby rotation of said mounting flange also rotates said eccentric.

3. A device as claimed in claim 2, in which said flange nut is hexagonal.

4. A device as claimed in claim 1, further comprising means defining a recess in said inner flange, said adjusting eccentric engaging in said recess and said recess being concentric with said bolt and having a diameter which permits said eccentric to move radially to its full extent within said recess upon rotation of said eccentric on said bolt relative to said inner flange.

5. A device as claimed in claim 4, further comprising a hub on said inner flange, said hub projecting from said inner flange in a direction opposite to the face of said inner flange in which said recess is formed, and a peripheral collar on said inner flange projecting from said inner flange in the same direction as said hub.

6. A device as claimed in claim 1, further including indicator means indicating the direction of offset of said eccentric from the axis of said bolt.

7. A device as claimed in claim 3, further including indicator means indicating the directon of offset of said eccentric from the axis of said bolt, in which said indicator means is on the outer face of said flange nut.

8. A device as claimed in claim 3, in which said flanges and said eccentric are of plastics material.

9. A device as claimed in claim 1, in which anhoring means for securing said bolt includes an expansion sleeve mounted on the first section of said bolt.

10. A device as claimed in claim 9, further comprising a protective sleeve mounted on said bolt between said expansion sleeve and said eccentric.

11. A device as claimed in claim 1, further comprising a head on one end of said bolt formed by the first section thereof, a nut screwed onto the other end of said bolt formed by the second section thereof, said eccentric and said anchoring means being situated between said head and said nut.

* * * * *